US009052237B2

(12) United States Patent
Yamamura

(10) Patent No.: US 9,052,237 B2
(45) Date of Patent: Jun. 9, 2015

(54) DETECTION CIRCUIT, SENSOR DEVICE AND ELECTRONIC APPARATUS

(71) Applicant: SEIKO EPSON CORPORATION, Tokyo (JP)

(72) Inventor: Mitsuhiro Yamamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 264 days.

(21) Appl. No.: 13/848,358

(22) Filed: Mar. 21, 2013

(65) Prior Publication Data
US 2013/0277558 A1    Oct. 24, 2013

(30) Foreign Application Priority Data

Apr. 19, 2012    (JP) .................. 2012-095353

(51) Int. Cl.
*G01J 5/34* (2006.01)
*G01J 5/22* (2006.01)

(52) U.S. Cl.
CPC ..... *G01J 5/34* (2013.01); *G01J 5/22* (2013.01)

(58) Field of Classification Search
CPC .................. G01J 5/00; G01J 5/10; G01J 5/22; G01J 5/34
USPC ........................................................ 250/338.3
See application file for complete search history.

(56) References Cited

U.S. PATENT DOCUMENTS 7,847,252 B2    12/2010    Kawakubo et al.

FOREIGN PATENT DOCUMENTS

JP    2009-068863 A    4/2009

OTHER PUBLICATIONS

Daisuke Akai et al.; "Pyroelectric infrared sensors with fast response time and high sensitivity using epitaxial Pb(Zr,Ti) O3 Films on epitaxial γ-Al2O3/Si substrates"; Sensors and Actuators A: Physical, vols. 130-131; Aug. 14, 2006, pp. 111-115; Elsevier Science B.V.

*Primary Examiner* — Mark R Gaworecki
(74) *Attorney, Agent, or Firm* — Global IP Counselors, LLP

(57) ABSTRACT

Detection circuits include a pyroelectric element, source follower circuits that include transistors TN, TP1 in which a detection signal SD from the pyroelectric element is inputted to a gate, first switching elements that interrupt an electric current that flows in the transistors, and a second switching element that interrupts between the pyroelectric element and the gate of the transistor. The second switching element can interrupts a connection between the pyroelectric element and the gate of the transistor before the first switching elements interrupt the electric current that flows in the transistors TN, TP1.

13 Claims, 10 Drawing Sheets

DETECTION CIRCUIT, SENSOR DEVICE AND ELECTRONIC APPARATUS

CROSS-REFERENCE TO RELATED APPLICATIONS

This application claims priority to Japanese Patent Application No. 2012-095353 filed on Apr. 19, 2012. The entire disclosure of Japanese Patent Application No. 2012-095353 is hereby incorporated herein by reference.

BACKGROUND

1. Technical Field

The present invention relates to a detection circuit, a sensor device, an electronic apparatus, and the like having a pyroelectric element.

2. Background Technology

Infrared detection circuits in which pyroelectric elements or the like are employed are well-known. For example, infrared rays having wavelengths near 10 µm radiate from the human body, and detecting these rays allows information about the presence and temperature of a human body to be acquired without physical contact. Using such an infrared detection circuit therefore allows intrusion detection or measurements of physical quantities to be implemented.

The technologies disclosed in, for example, Non-Patent Document 1 and Patent Document 1 are well-known for infrared detection circuits. In the Non-Patent Document 1, a source follower circuit, which is configured from a transistor (JFET) and a resistor connected in series, is used to detect the pyroelectric current of a pyroelectric element.

Daisuke Akai et al., "Pyroelectric infrared sensors with fast response time and high sensitivity using epitaxial PbZr, TiO3 films on epitaxial γ-Al2O3/Si substrates." Sensors and Actuators A: Physical, Volumes 130-131, 14 Aug. 2006, Pages 111-115, Elsevier Science B. V. (Non-Patent Document 1) is an example of the related art.

SUMMARY

Problems to be Solved by the Invention

In the Non-Patent Document 1, the current is constantly made to flow to a source follower circuit in each pixel circuit. The current is increased in accordance with an increase of a number of pixels so that it causes a large supply-voltage depression.

According to some aspects of the invention, it can provide a detection circuit, a sensor device, and an electronic apparatus that suppress to constantly flow the current to the source follower circuit in the pixel circuit and that can suppress noise that causes an adverse effect to the pyroelectric current at the time of current interruption.

Means Used to Solve the Above-Mentioned Problems (1) One aspect of the invention relates to a detection circuit including: a pyroelectric circuit;
a source follower circuit that includes a transistor in which a detection signal is inputted to a gate from the pyroelectric element;
a first switching element that interrupts electric current that flows to the transistor; and
a second switching element that interrupts a connection between the pyroelectric element and the gate of the transistor.

According to one aspect of the invention, since the first switching element interrupts the electric current that flow the transistor in the source follower circuit, it can suppress to constantly flow the electric current to the source follower circuit in the pixel circuit. When the source follower circuit is operated by an interruption release operation of the first switching element, a switching noise occurs because the relatively large electric current flows in the transistor in the source follower circuit. This switching noise is transferred to the gate through a parasitic capacitance between the gate sources of the transistor. When the noise is transferred to the pyroelectric element, an electric charge caused by a small pyroelectric current can be buried in a large electric charge so the source follower circuit cannot detect a voltage change in accordance with a change of the pyroelectric current. Since the second switching element can interrupt the connection between the pyroelectric element and the gate of the transistor, the switching noise is not transferred to the pyroelectric element. By the way, the switching noise caused by turning on and off of the second switching element can be ignored because the pyroelectric current from the pyroelectric element is sufficiently small.

(2) In one aspect of the invention, the second switching element can interrupts the gate between the pyroelectric element and the transistor before the first switching element releases an interruption of the electric current that flows to the transistor.

Because of this, the switching noise is not transferred to the pyroelectric element during the operation of the source follower circuit. By the way, it does not concern as a problem even if the switching noise is transferred to the pyroelectric element during the interruption operation of the first switching element. Specifically, when the first switching element interrupts the electric current that flows to the transistor, the second switching element can maintain the connection of the gate of the transistor with the pyroelectric element. This is because the source follower circuit is in an operation stop state.

(3) In one aspect of the invention, it can further include a discharge switch that discharges an electric charge of a wire that connects between the second switching element and the gate of the transistor.

The discharge switch can discharge the electric charge including the switching noise when the switching noise is superimposed in the wire that connects with the second switching element from the gate.

(4) In one aspect of the invention, the electric discharge by the discharge switch can be end after the first switching element released the interruption of the electric current that flows in the transistor and in addition, before the second switching element releases the interruption between the pyroelectric element and the gate of the transistor.

Because of this, even when the switching noise is generated by the operation of the first switching element, the noise of the electric charge is discharged by the discharge switch, and after the electric discharge, the noise of the electric charge does not transfer to the pyroelectric element because the gate and the pyroelectric element are connected by the second switching element.

(5) In one aspect of the invention, by the second switching element, the discharge switch can start the discharge operation before releasing the connection between the gate and the pyroelectric element.

By turning on and off the discharge switch, a signal (voltage change) based on a change between an electric charge that was charged in the pyroelectric element after the light irradiation and an electric charge that was discharged by the pyroelectric element before the light irradiation can be detected. Thus, the voltage changes before and after the light irradiation can be detected with high sensitivity.

(6) In one aspect of the invention, the source follower circuit can include a first P-type transistor that is provided between an output node of the detection circuit and a low-potential power node, a detection signal from the pyroelectric element being inputted to a gate of the first P-type transistor; and a second P-type transistor that is provided between a high-potential powder node and the output node, and a gate of the second P-type transistor being set to a reference voltage.

Because of this, an effect of characteristic variations such as a threshold value voltage, and the like in the first and second transistors that influence to an output voltage can be suppressed so that it is possible to reduce variations of the output voltage caused by variations of a device characteristic.

(7) In one aspect of the invention, it further includes a reference voltage generation circuit that supplies a reference voltage to the gate of the second P-type transistor, wherein the reference voltage generation circuit has a third P-type transistor and a fourth P-type transistor that are provided with a serial connection between the high-potential power node and the low-potential power node, wherein a connection node between a source of the third P-type transistor in which the low-potential power node is connected to a drain and a drain of the fourth P-type transistor in which the high-potential power node is connected to a source is defined as an output node of the reference voltage generation circuit, wherein in the third P-type transistor, the low power node is connected to a gate, and wherein in the fourth P-type transistor, the output node of the reference voltage generation circuit can be connected to the gate.

Because of this, the third and fourth P-type transistors of the reference voltage generation circuit that generate a reference voltage Vcc/2 have the same configuration as the first and second P-type transistors. Even when it has variations in a process, it tends to be the same variations as the first and second P-type transistors so that the relative variations are resolved and an output that is less reliant on the process change can be secured. Specifically, the effect of the process variations can be minimized when the first to fourth P-type transistors are made in a same size.

(8) In one aspect of the invention, the first switching element is a fifth P-type transistor that interrupts an electric current that flows to the first P-type transistor and the second P-type transistor, the reference voltage generation circuit has a sixth P-type transistor that interrupts an electric current that flows to the third P-type transistor and the fourth P-type transistor, and the same signal can be supplied to the gates of the fifth P-type transistor and the sixth P-type transistor.

Because of this, a through-current can be suppressed and a consumed power is reduced in both the source follower circuit and the reference voltage generation circuit that drives the source follower circuit.

(9) Another aspect of the invention defines a sensor device that includes the detection circuits of (1) to (8) as described above.

(10) Still another aspect of the invention relates to a sensor device including:

a plurality of row lines;

a plurality of column lines;

a plurality of pixel circuits that are connected to each one of the plurality of row lines and the plurality of column lines;

wherein each of the plurality of pixel circuits includes a pyroelectric element, a source follower circuit that includes a transistor in which a detection signal is inputted to a gate from the pyroelectric element, a first switching element that interrupts an electric current that flows to the transistor, a second switching element that interrupts between the pyroelectric element and the gate of the transistor before the first switching element interrupts the interruption of the electric current that flows to the transistor, a pixel selection switch that supplies a signal based on a change of the electric charge of the pyroelectric element to one of the plurality of column lines in a period that one of the plurality of row lines is driven, and a discharge switch that discharges the electric current in a wire that connects between the second switching element and the gate of the transistor, wherein in the pixel circuits that connect to one of the driven row lines, the electric discharge performed by the discharge switch is end after the first switching element released the interruption of the electric current that flows to the transistor and additionally, before the second switching element releases the interruption of the connection between the pyroelectric element and the gate of the transistor.

Because of this, in a case of reading out simultaneously from the pixel circuits that connect to one of the row lines every period of driving one of the row lines, the above described switching noise that gives adverse effect to the pyroelectric element can be eliminated.

(11) In still another aspect of the invention, the first switching element can share with the pixel circuits that connect to the one of the row lines. Because of this, it is only one first switching element that is shared for the pixel circuits connected to one of the row lines is provided so that it does not have to provide the first switching element for each of the pixel circuits that connect to one of the row lines.

(12) Still another aspect of the invention defines an electronic apparatus that includes the detection devices of (1) to (8) and the sensor devices of (9) to (11).

BRIEF DESCRIPTION OF THE DRAWINGS

Referring now to the attached drawings which form a part of this original disclosure.

DETAILED DESCRIPTION OF EXEMPLARY EMBODIMENTS

Preferred embodiments of the invention will be described in detail below. The present embodiment described below does not unduly limit the content of the invention described in the claims, and not all of the configurations described in the present embodiment are necessarily the means for solving problems using the invention.

1. First Embodiment

Figure 1:
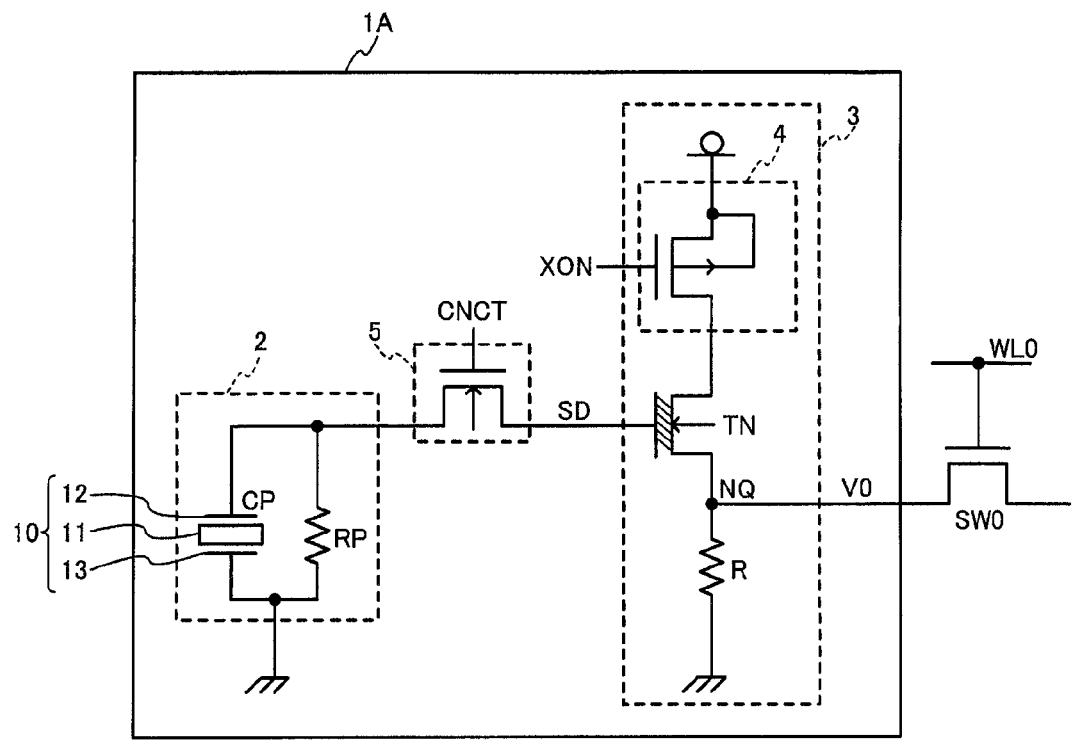
FIG. 1 is a circuit diagram of a detection circuit according to one embodiment of the invention.

A detection circuit 1A (it can be called as a pixel circuit) shown in FIG. 1 has a basic circuit that includes a pyroelectric element 2 and a source follower circuit 3. The pixel circuit 1A shown in FIG. 1 can connect to a pixel selection switch SW0 that is controlled by a row line WL0.

The pyroelectric element 2 is equivalently indicated by a capacitor CP and a resistor RP of a pyroelectric capacitor 10. For example, the light such that the wavelength is an infrared band frequency (infrared ray) or terahertz light (it is also called as an electromagnetic ray), or the like is irradiated to the pyroelectric element 2, and the intrinsic polarization in response to the temperature of the pyroelectric element 2 is generated in the pyroelectric body (ferroelectric) 11 of the pyroelectric capacitor 10. And, electrical neutrality relative to the surface charge of electrodes 12, 13 is maintained.

The source follower circuit 3 includes, for example, an N-type depletion-mode transistor TN and a pull-down resistor R.

The N-type depletion-mode transistor TN and the resistor R are provided in series between a VCC node (broadly speaking, the power node on the high-potential side) and a GND node (broadly speaking, the power node on the low-potential side) to configure a source follower circuit 3.

A detection signal SD (detection voltage) is inputted from the pyroelectric element 2 to the gate of the N-type transistor TN. The source of the N-type transistor TN is connected to one end of the resistor R. The source follower circuit is configured from the transistor TN and the resistor R, and the gain thereof is approximately 1. An output voltage VQ that changes along with changes in the voltage of the detection signal SD is outputted from an output node NQ that corresponds to the source of the N-type transistor TN.

The pixel circuit 1A of the present embodiment further provides an additional configuration in the basic circuit that includes the pyroelectric element 2 and the source follower circuit 3. The first switching element 4 interrupts the electric current that flows to the N-type transistor TN and it is formed by, e.g., a P-type transistor that is connected to the N-type transistor TN in in series. The second switching element 5 interrupts a connection between the pyroelectric element 2 and the gate of the N-type transistor TN, and it is formed by, e.g., the N-type transistor.

Figure 2:
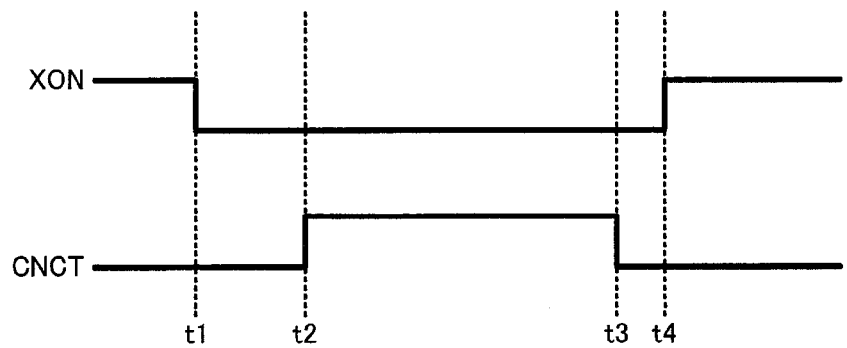
FIG. 2 is a timing chart showing an operation of the detection circuit shown in FIG. 1.

In the pixel circuit 1A, a signal XON inputted to the gate of the first switching element 4 becomes LOW in a limited time period as shown in FIG. 2. By the way, the signal XON can be an inversion signal of a horizontal scanning signal that activates the row line WL0 as show in FIG. 1 and turns on the pixel selection switch SW0. The first switching transistor 4 is turned off in a period that the signal XON is HIGH so that it interrupts the electric current that flows to the transistor TN in the source follower circuit 3, and it can suppress to flow the electric current constantly to the source follower circuit 3 in the pixel circuit 1A.

The first switching element 4 is turned on in a period that the signal XON is LOW. In this case, when the temperature change occurs in the pyroelectric element 2 due to the light irradiation, the pyroelectric current flows in the pyroelectric element 2 in which an amount of polarization is changed by the temperature change so that the detection signal SD changes. The transistor TN that supplies the detection signal SD to the gate outputs an output voltage VO that changes in accordance with the voltage change of the detection signal SD from the output node NQ in response to the source.

In this time, when the first switching element 4 is turned on and off, it significantly changes the source voltage, the channel voltage, are drain voltage of the transistor TN. These voltage changes are transferred as a noise to the gate of the transistor through a gate parasitic capacitance of the relatively-large transistor TN, and additionally, it might be transferred to the pyroelectric 2 from the gate.

If the noise was transferred to the pyroelectric element 2, an electric charge caused by a small pyroelectric current can be buried in a large electric charge so the source follower circuit cannot detect a voltage change in accordance with a change of the pyroelectric current.

Because of that, the second switching element 5 that interrupts the connection between the pyroelectric element 2 and the gate of the transistor TN is provided. When the first switching element 4 is turned on and off, the connection between the pyroelectric element 2 and the gate of the transistor TN can be interrupted by the second switching element 5. Because of this, even when a switching noise is transferred to the gate of the transistor TN, it can be prevented from transferring the switching noise to the pyroelectric element 2. By the way, since the second switching element 5 is configured by a transistor that generates small noise, the switching noise caused by turning on and off can be minimized so that it can be ignored.

Specifically, when the first switching element 4 is turned on at the time t1 of FIG. 2 and releases the interruption, the noise is generated and this becomes a problem because a detection operation is executed in an operation status of the source follower circuit 3 and in a condition that the detection signal SD based on the electric charge superimposed with the noise supplies to the gate of the transistor TN of the source follower circuit 3. Accordingly, in the present embodiment as shown in FIG. 2, when the signal XON turns to HIGH at the time t1 and the interruption is released by the first switching element 4, the signal CNCT that is supplied to the gate of the second switching element 5 turns to LOW, and the connection between the pyroelectric element 2 and the gate of the transistor TN is interrupted by the second switching element 5.

At the time t2 which is after the time t1 of FIG. 2, the signal CNCT that is supplied to the gate of the second switching element 5 turns to HIGH so that the detection signal SD based on the electric charge that is not superimposed by the noise from the pyroelectric element 2 is supplied to the gate of the transistor TN of the source follower circuit 3 and the detection operation can be executed.

On the other hand, a switching noise when the first switching element 4 performs the interruption operation at the time t4 of FIG. 2 does not concern as a problem even though it transfers to the pyroelectric element 2. Specifically, when the first switching element 4 interrupts the electric current that flows to the transistor TN, the second switching element 5 can maintain the connection between the pyroelectric element 2 and the gate of the transistor TN. In this time, the operation of the source follower circuit 3 is in a stop state. Therefore, the signal CNCT that is supplied to the gate of the second switching element 5 turns to LOW and the time t3 that starts the interruption operation performed by the second switching element 5 can be any time of before and after the time t4.

2. Second Embodiment

Figure 3:
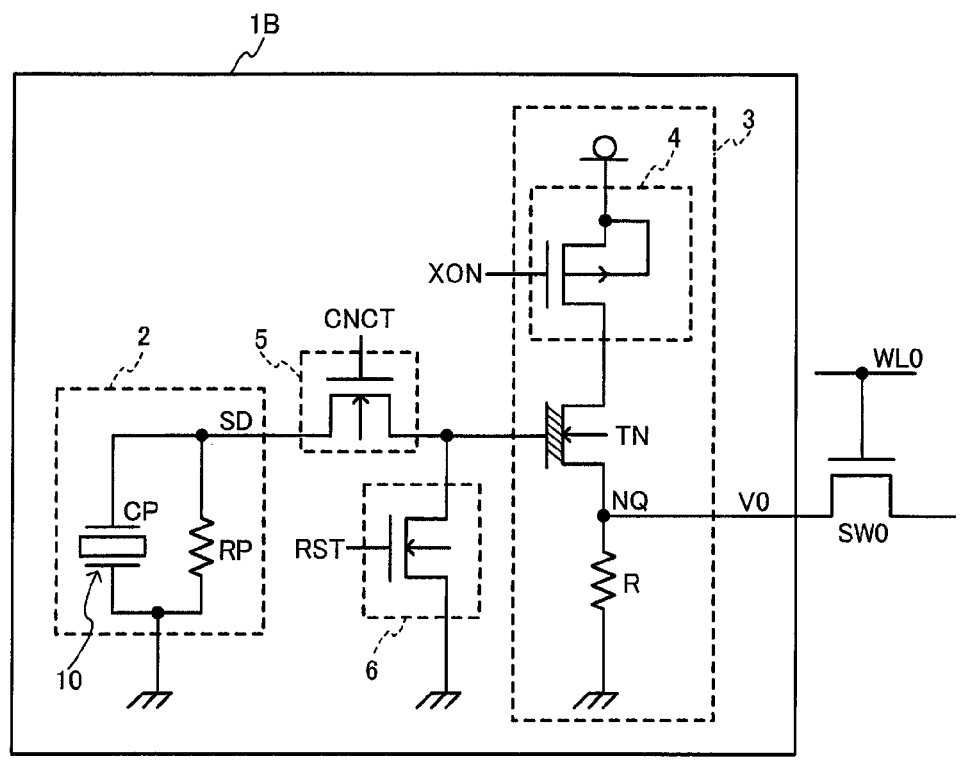
FIG. 3 is a circuit diagram of a detection circuit according to another embodiment of the invention.

FIG. 3 shows a detection circuit (pixel circuit) 1B added with a discharge switch 6 to the detection circuit (pixel circuit) 1A of FIG. 1.

The discharge switch shown in FIG. 3 is a switch that discharges an electric charge of a wire which connects between the second switching element 5 and the gate of the transistor TN, and for example, it is formed by an N-type transistor.

When a switching noise is superimposed on the wire that connects between the gate of the transistor TN and the second switching element 5, the discharge switch 6 can discharge the electric charge that includes the switching noise.

Figure 4:
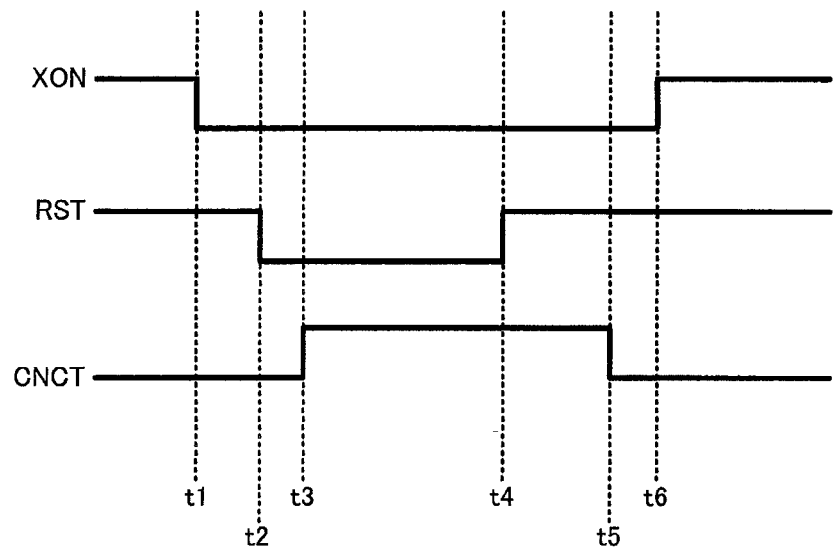
FIG. 4 is a timing chart showing an operation of the detection circuit shown in FIG. 3.

FIG. 4 is a timing chart of the pixel circuit 1B shown in FIG. 3, and the LOW period of t1 to t6 of the signal XON and the HIGH period t3 to t5 of the signal CNCT are set in the same manner as FIG. 2.

The discharge operation performed by the discharge switch 6 is executed before the time t1 shown in FIG. 4, and it can be end at the time t2 which is between the time t1 and the time t3. Specifically, the discharge operation performed by the discharge switch 6 is after the time (time t3 of FIG. 4) that the first switching element 4 released the interruption of the electric current that flows in the transistor TN, and in addition, it can be end after the time (time t1 of FIG. 4) that the second switching element 5 released the interruption of the connection between the pyroelectric element 2 and the gate of the transistor TN.

Because of this, even when the switching noise was generated by the operation of the first switching element 4, the noise of the electric charge is discharged by the discharge switch 6, and after the discharge, the gate of the transistor TN and the pyroelectric element 2 are connected by the second switching element 5 so that the noise of the electric charge does not transfer to the pyroelectric element 2.

Also, it is preferable to start the discharge operation performed by the discharge switch 6 at the same time or before the time t1 shown in FIG. 4. This is because even when the switching noise is generated by the operation of the first switching element 4 at the time t1, the noise of the electric charge can be immediately discharged by the discharge switch 6.

Also, at the time t4 which is before the time t5 that the connection between the gate of the transistor TN and the pyroelectric element 2 is released by the second switching element 5, the discharge switch 6 can start the discharge operation.

At this point, in the period from t2 to t4 of FIG. 4 that the discharge switch 6 of FIG. 3 is turned off; this is the condition that the electric current is charged in the pyroelectric element 2. On the other hand, when the discharge switch 6 is turned on at the time t4 of FIG. 4, the electric charge that was stored during the light irradiation is discharged. The electric charge of the pyroelectric element 2 after the discharge switch 6 was turned on becomes an electric charge at the time of the non-light irradiation even though it is during the light irradiation. Specifically, the output voltage VO of the source follower circuit 3 becomes a voltage change reflected by the pyroelectric current before and after the light irradiation. By the way, even though 0V is applied to the gate of the transistor TN of the source follower circuit 3 by turning on the discharge switch 6, the transistor TN is a depletion-type so that the output voltage VO before the light irradiation can be outputted.

Because of this, by turning on the discharge switch 6 in a middle of the period from t3 to t5 that the second switching element 5 is turned on, the discharge switch 6 can be used as an electronic chopper. Specifically, although the light is continuously irradiated by a mechanical chopper which is not shown in the drawing, by turning on and off the discharge switch 6, the change between the electric charge of the pyroelectric element 2 after the light irradiation in the period from t3 to t4 and the electric charge after the discharge which is equivalent to before the light irradiation in the period from t4 to t5 can be detected. Thus, the voltage change VO before and after the light irradiation which is outputted during the period from t3 to t5 in a chronological order can be detected with high sensitivity. Because of this, it is not necessary have to provide an amplifier circuit in each pixel circuit 1B so that the pixel circuit 1B can be minimized.

3. Third Embodiment 3.1. Source follower circuit

Figure 5:
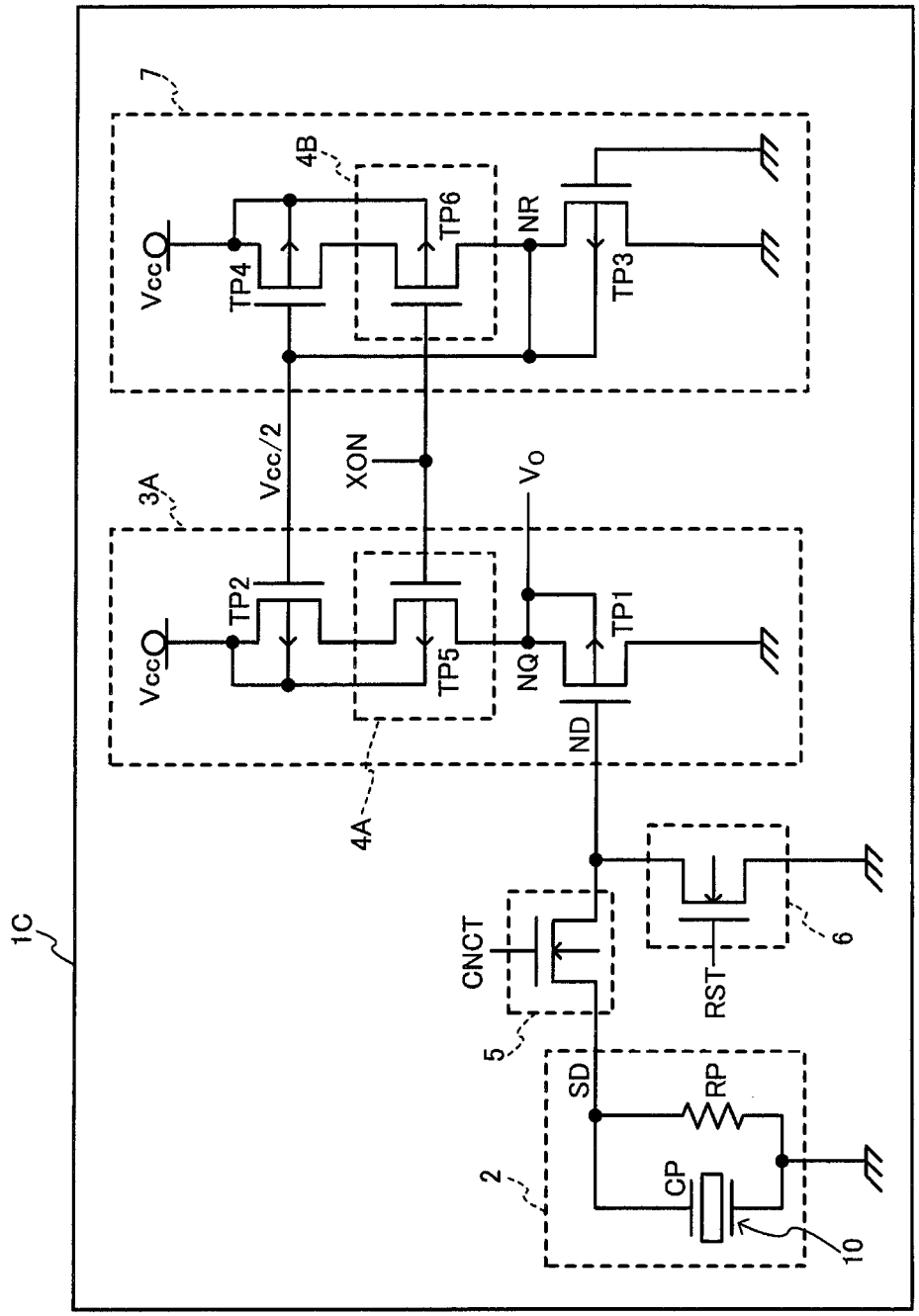
FIG. 5 is a circuit diagram of a detection circuit according to still another embodiment of the invention that provides a source follower circuit provided with two P-type transistors, and a reference voltage generation circuit.

FIG. 5 shows a detection circuit (pixel circuit) 1C according to still another embodiment of the invention. In addition to the N-type depletion transistor TN shown in FIG. 3, the source follower circuit 3A of the pixel circuit 1C includes a first P-type transistor TP1 and a second P-type transistor TP2. The point of which the detection circuit 1C shown in FIG. 5 has the pyroelectric element 2, the second switching element 5, and the discharge switch 6 is the same as FIG. 3. By the way, the pixel selection switch SW0 connected to the detection circuit 1C is omitted.

The first P-type transistor TP1 (P-type MOS transistor) is provided between the output node NQ and the GND node (low electric potential power node). For example, in FIG. 5, the source of the TP1 is connected to the output node NQ, the drain is connected to the GND node, and the detection signal SD from the pyroelectric element 2 is inputted to the gate.

The second P-type transistor TP2 (P-type MOS transistor) is provided between the VCC node (high electric potential power node) and the output node NQ. For example, in FIG. 5, the source of the TP2 is connected to the VCC node, the drain is connected to the output node NQ, the gate is connected to the output node NQ, and the gate is set for a reference voltage Vcc/2.

Also, a substrate potential of the P-type transistor TP1 is set to an electric potential of the source of the TP1. Also, a substrate potential of the P-type transistor TP2 is set to an electric potential of the source of the TP2. Because of this, by setting the substrate potentials of the P-type transistors TP1 and TP2 as the source potentials, it can be prevented from the change of the threshold voltages of TP1 and TP2 caused by the substrate bias effect so that the threshold voltages of TP1 and TP2 are possible to get closer.

The device characteristics such as the threshold voltages of the P-type transistors TP1 and TP2 are possible to get closer by providing both P-type transistors TP1 and TP2 in the same gate length and gate width. Because of this, the change of the output voltage VQ caused by the production process change, or the like can be suppressed.

As shown in FIG. 5, the gate of the transistor TP2 is set as the reference voltage Vcc/2. Accordingly, the voltage between the gate and the source of the transistor TP2 is approximate Vcc/2, and TP2 is operated in a saturation range so that the electric current, which is determined by only the approximate voltage Vcc/2 between the gate and the source and the threshold voltage, flows in the TP2.

On the other hand, since the transistor TP1 is connected to the transistor TP2 in series, the same electric current flows in the TP1. And, the substrate potential of the transistor TP1 is set as the source potential in the same manner as the transistor TP2. Accordingly, the threshold voltage of the transistor TP1 and the threshold voltage of the transistor TP2 are equivalent. In addition, when the transistor TP1 is operated in a saturation range and the transistors TP1 and TP2 are in the same transistor size (the gate width and the gate length are the same), the voltage between the gate and the source of the TP1 and the voltage between the gate and the source of the TP2 are approximately the same voltage as Vcc/2. Also, the gate of the transistor TP1 is connected to the pyroelectric element 2 via the second switching element 5, and a resistance PR of the pyroelectric element 10 is existed between the node ND of the gate of the TP1 and the GND so that the node ND is constantly set to the approximate 0V. More specifically, when the discharge switch 6 is turned on, the node ND is 0V. Also, when the pyroelectric element 2 is connected to the node ND via the second switching element 5, the electric charge stored in the pyroelectric element 2 is substantially small so that the potential of the node ND charged by the electric charge is approximately 0V. Therefore, the voltage VQ of the output node NQ of the detection circuit which is the source node of the transistor TP1 is constantly set to about the same voltage as Vcc/2.

In this condition, when the temperature of the pyroelectric element 2 is changed by irradiating the light to the pyroelectric 2, the gate (gate capacitance) of the transistor TP1 is transiently charged by the generated pyroelectric current in the period from t3 to t4 so that the voltage is changed to ΔV. In this time, an equivalent voltage flows in the transistor TP1 and the transistor TP2 so that the voltage of the node NQ is changed to be equivalent for the voltages between the gate and the source of the transistor TP1 and the transistor TP2. Because of this, the both voltages between the gate and the source of the transistor TP1 and the transistor TP2 become Vcc/2−ΔV, and in this time, the VQ as the source voltage of the TP1 becomes VQ=Vcc/2+ΔV/2. More specifically, the circuit provided by the transistors TP1 and TP2 operates as the source followers circuit 3A of gain=0.5. By the way, the first switching element 4A that interrupts the electric current of the source follower circuit 3A is functioned as the first switching element 4 of FIG. 1 and FIG. 3. Therefore, the discharge voltage before the light irradiation in the period from t4 to t5 of FIG. 4 can be also sampled.

In the detection circuit of the present embodiment, the threshold voltages, or the like of the P-type transistors TP1 and TP2 are compensated so that the characteristic variations of these threshold voltages can be suppressed as to present as variations of the output voltages. Accordingly, the variations of the output voltage can be reduced so that the detection accuracy of the infrared ray can be improved.

3.2. Reference Voltage Generation Circuit

In FIG. 5, for example, a pixel circuit 1C can be provided with the reference voltage generation circuit 7 that supplies a reference voltage Vcc/2 to the gate of the second P-type transistor TP2.

The reference voltage generation circuit 7 has the third P-type transistor TP3 and the fourth P-type transistor TP4 and they are connected in series between the high electric potential power node and the low electric potential power node. A connection node NR between a source of the third P-type transistor TP3 in which the low electric potential power node is connected to a drain and a drain of the fourth P-type transistor TP4 in which the high electric potential power node is connected to a source is defined as an output node of the reference voltage generation circuit 7.

In the third P-type transistor TP3, the low power node is connected to the gate, and in the fourth P-type transistor TP4, the output node NR of the reference voltage generation circuit 7 is connected to the gate.

Specifically, the configuration of the third and fourth P-type transistors TP3, TP4 of the reference voltage circuit 7 is substantively the same as the first and second P-type transistors TP1, TP2 that connect to the pyroelectric element 2. The voltage 0V of the low electric potential power node is supplied to the gate of the third P-type transistor TP3, but in the steady state of the pyroelectric element 2, the gate voltage SD of the first P-type transistor TP1 is 0V as described above.

In this point, by operating the third and fourth transistors TP3, TP4 in the same manner as the first and second P-type transistors TP1, TP2 when the pyroelectric element 2 is in the steady state, the voltage of the output node NR of the reference voltage generation circuit 7 becomes a constant voltage of Vcc/2. Thus, the reference voltage Vcc/2 can be supplied to the gate of the second P-type transistor TP2.

Because of this, the third and fourth P-type transistors TP3, TP4 of the reference voltage generation circuit 7 become the same configuration as the source followers circuit 3A of the first and second P-type transistors TP1, TP2 that connect to the pyroelectric element 2, and even though there are variations of the processes, the first and second P-type transistors TP1, TP2 tend to be the same so that it can secure an output that is less reliant on the process change. Specifically, by providing the first to fourth P-type transistors TP1 to TP4 in the same size, the effect of the variations of the processes can be minimized.

3.3. First Switching Element

In the same manner as the first switching element 4 as shown in FIG. 1, the first switching element 4A that interrupts the electric current of the source follower circuit 3, and the first switching element 4B that interrupts the electric current of the reference voltage generation circuit 7 can be provided in FIG. 5. The first switching element 4A can be formed by the fifth P-type transistor TP5, and the first switching element 4B can be formed by the sixth P-type transistor TP6. In this case, the first switching elements 4A, 4B can be turned on and off by the same signal XON.

4. Sensor Device 4.1. Summary of the Sensor Device

Figure 6A:
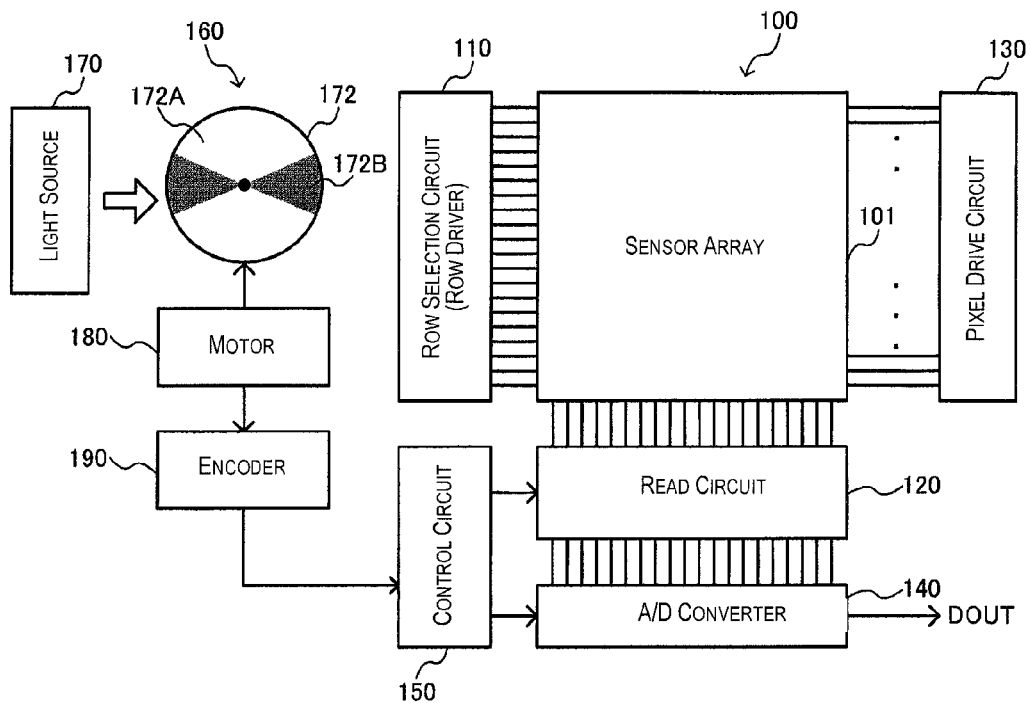
FIGS. 6A and 6B are a configuration diagram of a sensor device.
Figure 6B:
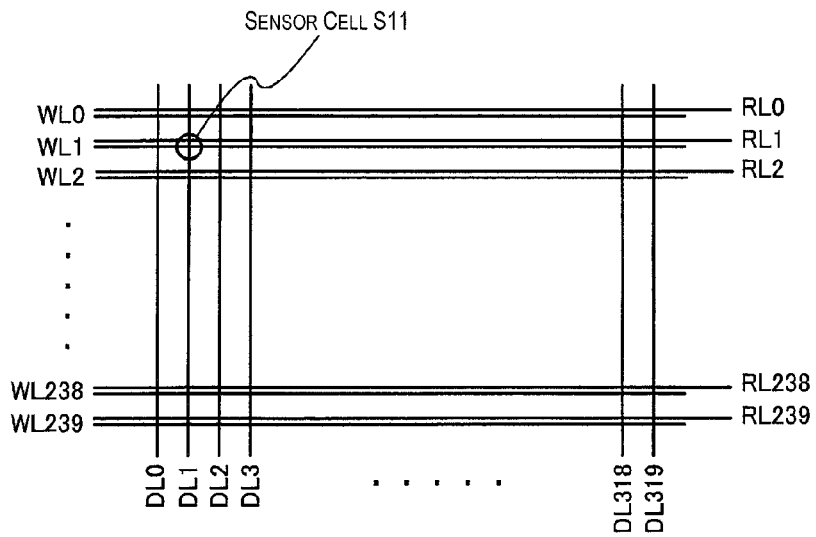

FIGS. 6A and 6B show a sensor device 100 according to one embodiment of the invention. The sensor device 100 includes a sensor array 101, a row-select circuit (row driver) 110, a read circuit 120, and pixel drive circuit 130. Also, an A/D converter 140 and a control circuit 150 can be included. For example, an infrared camera, a terahertz camera, or the like can be realized by using this sensor device 100.

In the sensor array 101 (focal plane array), a plurality of row lines (word lines, scanning lines) WL, and a plurality of column lines (data lines) DL are provided. By the way, the signal lines of the signals XON, CNCT and RST shown in FIGS. 1, 3 and 5 are omitted in FIGS. 6A and 6B.

The respective sensor cells of the sensor array 101 are arranged (formed) at locations corresponding to intersections between the respective row lines WL and the respective column lines DL. For example, the sensor cell S11 of FIG. 6B is arranged at a location corresponding to the intersection between the row line WL1 and the column line DL 1. Other sensor cells are arranged in the same manner.

The row-select circuit 110 connects to the plurality of row lines WL and performs a selection operation of the respective row lines WL. If the QVGA (320×240 pixels) sensor array 101 (focal plane array) such as the one shown in FIG. 1(B) is taken as an example, operations are performed for sequentially selecting (scanning) row lines WL0, WL1, WL2, . . . WL239. In other words, a signal for selecting the row lines WL (a word select signal) is outputted to the sensor array 101.

The read circuit 120 connects to a plurality of column lines DL and performs a read out operation of the respective column lines DL. If the QVGA sensor array 101 is taken as an example, operations are performed for reading detection signals (detection current, detection charge) from column lines DL0, DL1, DL2 . . . DL319. For example, the read circuit 120 is provided with the respective amplifier circuits corresponding to the respective column lines among the plurality of column lines. The respective amplifier circuits perform an amplification process of the signals of the corresponding column lines.

The pixel drive circuit 130 drives the signal lines of the signals XON, CNCT and RST as shown in FIG. 1, FIG. 3, and FIG. 5.

The A/D converter part 140 performs A/D conversion to convert the detection voltage (measurement voltage, ultimate voltage) acquired in the read circuit 120 to digital data. Digital data DOUT that has been subjected to A/D conversion is outputted. Specifically, the A/D converter part 140 is provided with the respective A/D converters corresponding to the plurality of column lines DL. The A/D converters perform A/D conversion on the detection voltages acquired by the read circuit 120 for the corresponding column lines DL. One A/D converter is provided to correspond to a plurality of column lines DL, and this single A/D converter can be used to perform A/D conversion on the detection voltages of the plurality of column lines DL in a time-divided fashion. The configuration can also be such that the amplifier circuits of the read circuit 120 are not provided, and the signals of the respective column lines are inputted directly to the respective A/D converters of the A/D converter part 140.

The control circuit 150 (timing-generating circuit) generates a variety of control signals and outputs the signals that control a timing of the row-select circuit 110, the read circuit 120, the pixel drive circuit 130, and the A/D converter part 140.

The control circuit 150 of the sensor device 100 can input a timing signal from the electronic apparatus side in which the sensor device is equipped. For example, as shown in FIG. 6A, the electronic apparatus can have a light source 160 that is possible for the continuous control of infrared frequency light (infrared rays) and terahertz frequency light (it is also called as electromagnetic ray). The light source 160 can includes, for example, a light source 170 that is capable of continuous emission, a chopper 172, a motor 180 that operates a rotary drive of the chopper 172, and an encoder 190 that encodes rotational amount of the motor 180.

The chopper 172 is a disk formed by a transmissive part 172A that transmits continuous light to the sensor array 101 from the light source 170 and a block part 172B that blocks continuous light, and by driving the motor 180, the transmissive part 172A and a block part 172B are alternatively faced to the sensor array 101. The period that the transmissive part 172A of the chopper 172 is faced to the sensor array 101 can be more than the period of one horizontal scanning (1H). For example, it can be more than the period of one vertical scanning (1V). By inputting an output from the encoder 190 as a reference timing signal, the control circuit 150 of the sensor device 100 can generate a timing signal of the one horizontal scanning period (1H), the one vertical scanning period (1V), or other timing signals.

4.2. Read Circuit

Figure 7:
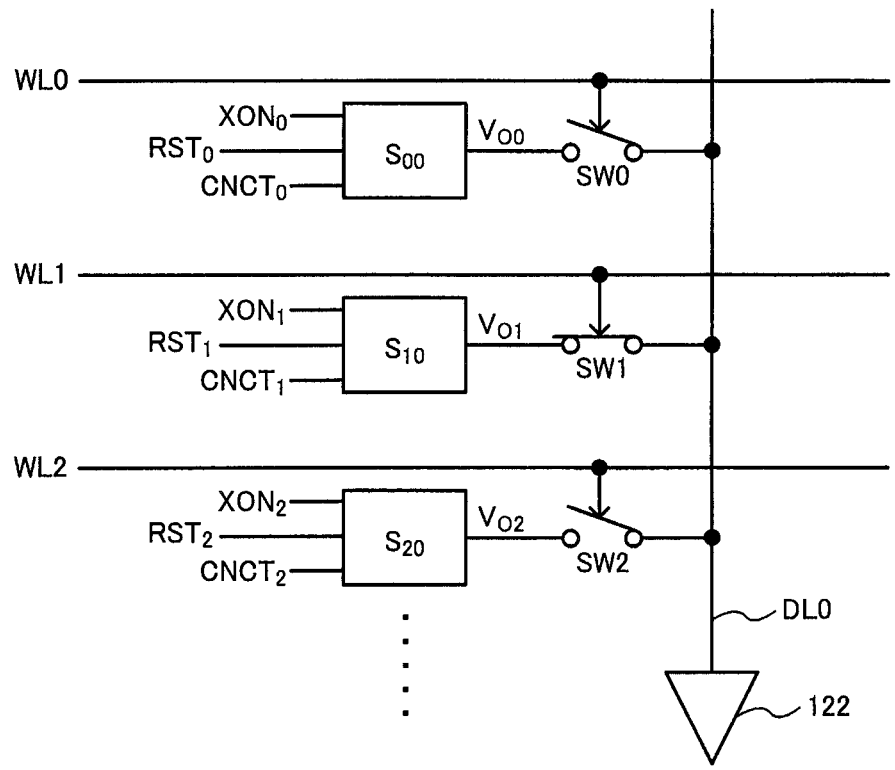
FIG. 7 is a block diagram showing a plurality of pixel circuits that connects to one of column lines provided with an amplifier circuit.

In the present embodiment, it is not necessary have to provide an amplifier circuit in each pixel circuit, but the read circuit 120 shown in FIG. 6A can have a plurality of amplifier circuits that are connected to the plurality of column lines DL0 to DL319, and an amplifier circuit 122 that is connected to the column line DL0 is shown in FIG. 7.

Figure 8:
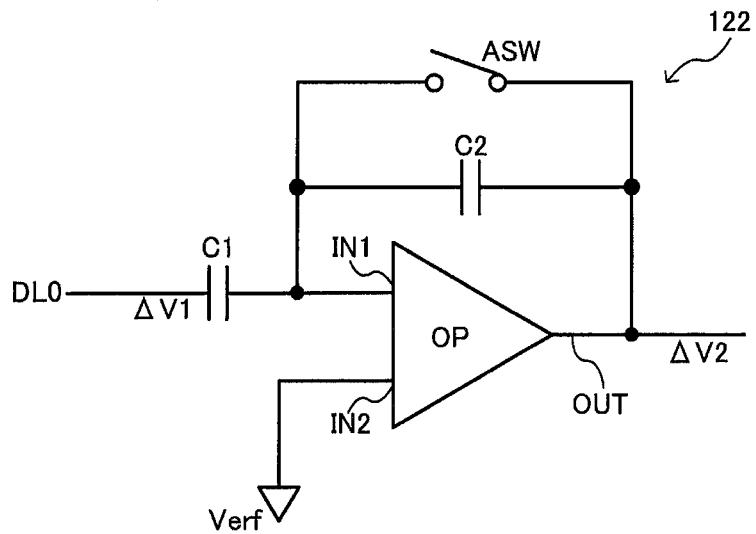
FIG. 8 is a circuit diagram showing the amplifier circuit.

As shown in FIG. 8 the amplifier circuit 122 shown in FIG. 7 has an amplifier OP to perform a differential amplification between the voltage from the column line DL0 that is inputted to the first input terminal IN1 and the reference voltage Vref (e.g., Vcc/2) that is inputted to the second input terminal IN2, and an amplifier switch ASW to short-circuit the first input terminal IN1 and the output terminal OUT.

One amplifier circuit 122 is provided in one of the column lines DL so that one amplifier circuit 122 is shared in a column direction of the plurality of pixel circuits 1 (pixel circuits 1 in sensor cells S00, S10, S20, . . . as shown in FIG. 7) that are connected to one of the column lines DL via the pixel selection switches SW0, SW1, SW2, . . . . When the amplifier switch ASW is turned on, the amplifier OP becomes a non-operating state by making short-circuit in the first input terminal S1 and the output terminal OUT. The amplifier OP becomes the non-operating state every one horizontal scanning period (1H) so that it can be prevented from a crosstalk that is affected between the voltages from the plurality of pixel circuits 1 to one of the column lines DL. By the way, the pixel selection switches SW0, SW1, SW2, . . . can be included in the correspondence pixel circuits.

4.3. Operation of a Sensor Device

Figure 9:
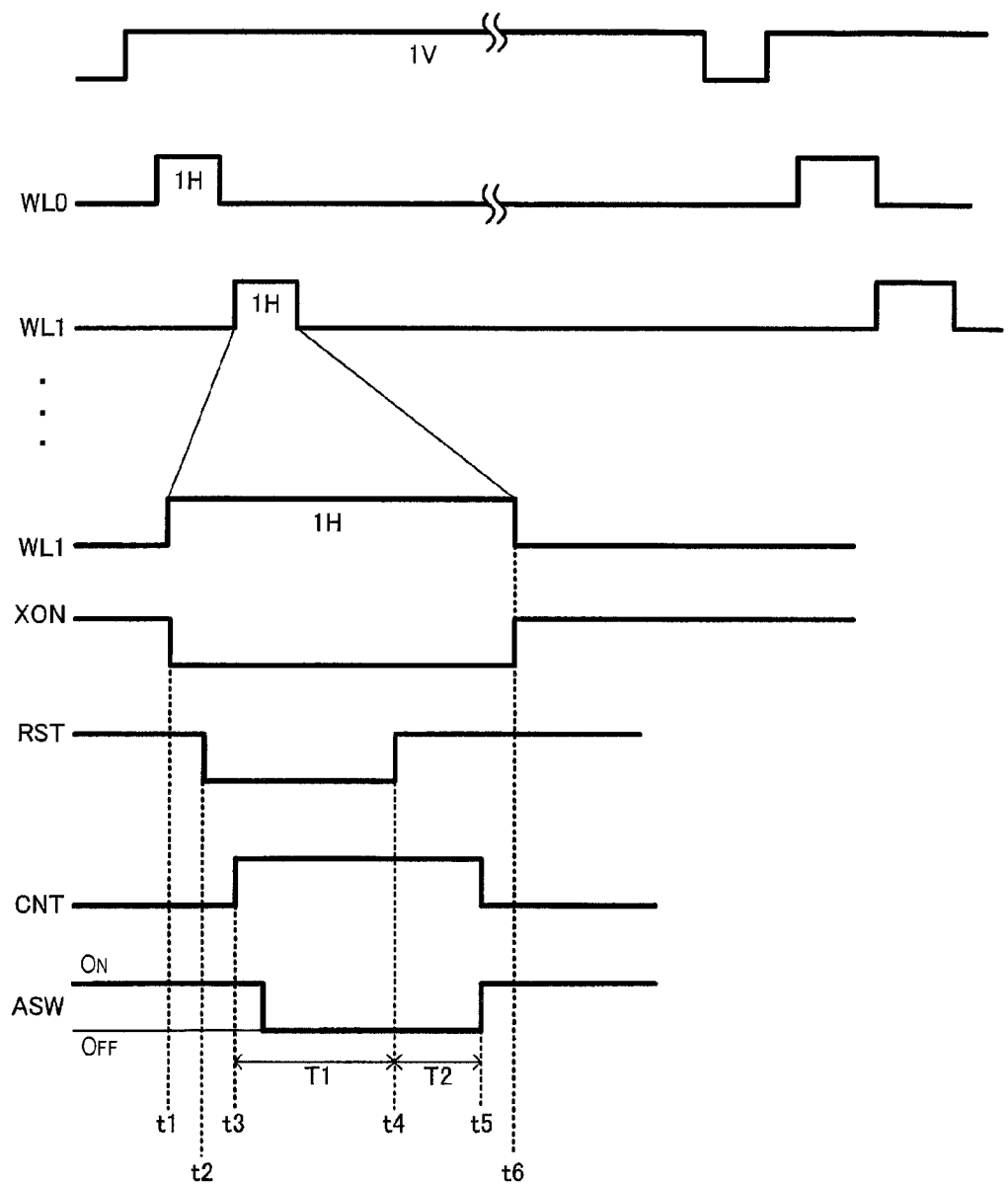
FIG. 9 is a timing chart of a sensor device.

FIG. 9 is a timing chart showing an operation of the sensor device 100. A period that the transmissive part 172A of the chopper 172 faces to the sensor array 101 is defined as the one vertical scanning period (1V) shown in FIG. 6A. The light is irradiated to the sensor array shown in FIG. 6A during the one vertical scanning period (1V) shown in FIG. 9.

The control circuit 150 shown in FIG. 6A generates a one vertical scanning signal indicating the one vertical scanning period (1V) based on a reference timing signal from the encoder 190 and additionally generates a one horizontal scanning signal indicating the one horizontal scanning period (1H) based on the number of row lines WL.

The row-select circuit 110 shown in FIG. 6A supplies a scanning signal of an electric potential, which becomes active every one horizontal scanning period (1H) shown in FIG. 9, to the plurality of row lines WL0, WL1, . . . . For example, when the electric potential of the row line WL1 becomes active, in 320 pixel circuits 1 that are connected to the row line WL1 shown in FIG. 7, the pixel selection switch SW1 shown in FIG. 7 is simultaneously turned on during the one horizontal scanning period (1H).

Because of this, the output voltage VO in accordance with the voltage change of the detection signal SD from the pyroelectric element 2 of the sensor device 100 in each of 320 pixel circuits 1 connected to the row line WL1 is possible to output to the plurality of column lines DL0 to DL239.

In the present embodiment, by a reset signal RST (FIG. 9) that is supplied to one of the plurality of reset lines RL0 to RL239 (RL1), the pixel drive circuit 130 turns on the discharge switches 6 in one row of the 320 pixel circuits 1 connected to, e.g., the row line WL1, which is the active electric potential, in a middle of the one horizontal scanning period (1H).

The one horizontal scanning period (1H) is included in the one vertical scanning period (1V) so that the light is incident on the sensor array 101 of FIG. 6A. In addition, the pixel selection switch SW1 of the corresponding pixel circuit 1 is turned on during the one horizontal scanning period (1H) so that the output voltage VO is outputted to the corresponding column line DL.

In this point, the signal XON can be an inversion signal of the horizontal scanning signal WL. Also, a start period of the off period of the amplifier switch ASW is set after the time t3 in which the signal CNCT becomes HIGH, and an end period of the off period of the amplifier switch ASW can correspond to the time t5 in which the HIGH period of the signal CNCT is end.

As shown in FIG. 9, the amplifier switch ASW is turned off before the discharge switch 6 is turned on in the one horizontal scanning period (1H). In the first period T1 between a time when the signal CNCT becomes HIGH and the second switching element 5 is turned on and a time when the discharge switch 6 is turned on, the voltage reflecting the pyroelectric current in which the electric charge was charged after the light irradiation outputs to the pyroelectric element 2. After that, in the second period T2 which is after the discharge switch 6 was turned on, the voltage reflecting the pyroelectric current before the light irradiation is outputted. In the first and second periods T1+T2 as discussed above, it is an operation condition that the amplifier switch ASW is turned off in the amplifier OP shown in FIG. 8, and in a middle of this period, the discharge switch 6 is turned on. The amplifier OP amplifies the difference (voltage change) $\Delta V1$ between the voltage in accordance with the pyroelectric current during the light irradiation in the first period T1 and the voltage in accordance with the pyroelectric current before the light irradiation in the second period T2.

By the way, in FIG. 9, it is set as equivalent to the relationship of the time from t1 to t6 shown in FIG. 4 so that the function effect as explained in FIG. 4 can be achieved in each pixel of the sensor device 100.

As shown in FIG. 8, the amplifier OP further includes the first capacitor C1 connected to the column line DL0 and the second capacitor C2 connected to the first input terminal IN1 and the output terminal OUT. In this point, when the voltage change from the column line DL0 is $\Delta V1$, the voltage change of the output terminal OUT of the amplifier OP is $\Delta V2$, the capacitance value of the first capacitor C1 is C1, and the capacitance value of the second capacitor C2 is C2, $\Delta V2 = \Delta V1 \times C1/C2$ is realized.

Because of this, to the voltage change $\Delta V2$ of the output terminal OUT of the amplifier OP, the voltage change $\Delta V1$ of the first input terminal IN1 is only amplified in a gain C1/C2 so that the change of the pyroelectric current can be amplified as a voltage change.

By the way, as the sensor device 100 shown in FIG. 6A, in a case that the sensor cells are formed in a matrix, a specific circuit, which is provided in one of the pixel circuits 1A, 1B, 1C shown in FIG. 1, FIG. 3, and FIG. 5, does not have to be provided in all of the pixel circuits so that the specific circuit can be shared with the plurality of pixel circuits.

Figure 10:
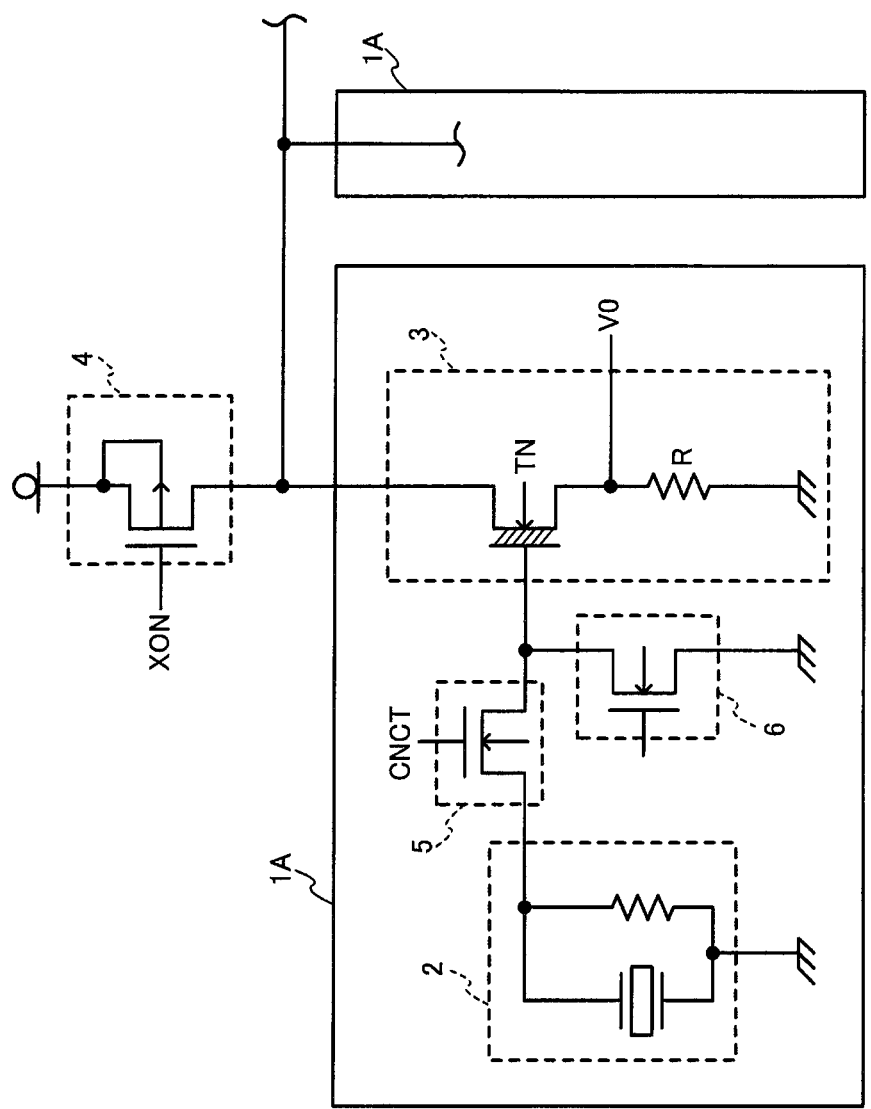
FIG. 10 is a circuit diagram of a modification example that shares one first switching element for the plurality of pixel circuits.

For example, FIG. 10 shows an example that one of the first switching elements 4 is shared by one row of the pixel circuits 1A connected to one of the row line WL. One row of the pixel circuits 1A connected to one of the row line WL are simultaneously operated in the same one horizontal scanning period (1H) so that an operation of the source follower circuit 3 in the one row of the pixel circuits 1A can be simultaneously stopped by one of the first switching elements 4.

Other than that, the first switching element 4 shown in FIG. 3 can be also shared in the same manner as FIG. 10. The reference voltage generation circuit 7 shown in FIG. 5 can be also shared in one row of the pixel circuits 1A connected to one of the row lines WL. If the first switching element 4B is not provided in the reference voltage generation circuit 7, the reference voltage generation circuit 7 can be shared in all pixel circuits in the sensor array 101 shown in FIGS. 6A and 6B.

5. Electronic Apparatus

Figure 11:
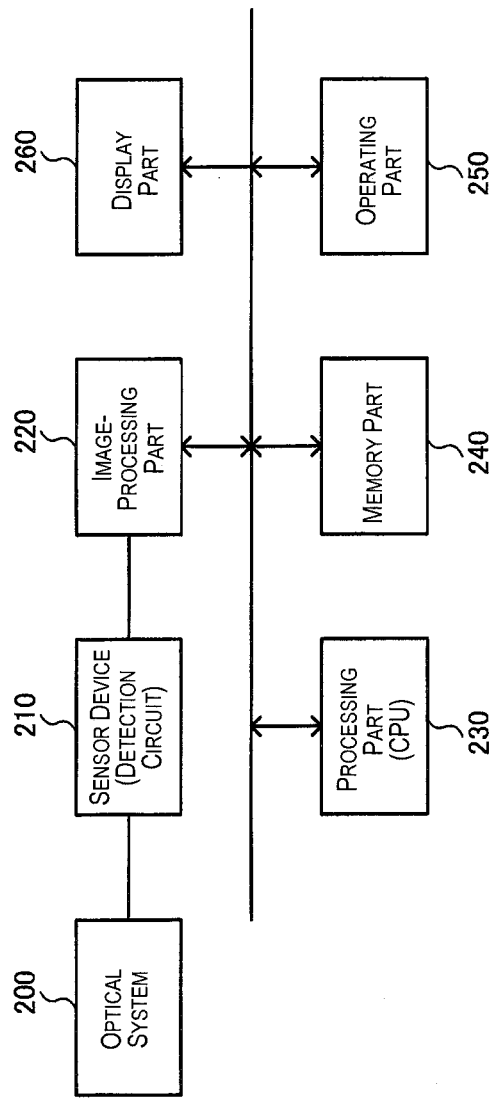
FIG. 11 is a block diagram of an electronic apparatus.

FIG. 11 shows a configuration example of an electronic apparatus that includes the sensor device of the present embodiment. Besides the light source 160 shown in FIG. 6A, the electronic apparatus includes an optical system 200, a sensor device 210 (detection circuit), an image processing part 220, a processing part 230, a memory part 240, a control part 250, and a display part 260. By the way, the configuration is not limited to the electronic apparatus of the present embodiment shown in FIG. 11 so that a part of the components (e.g., the optical system, the control part, the display part, or the like) can be omitted or it can be possible to add other components.

The optical system 200 includes, e.g., one or a plurality of lenses, a drive part that drives these lenses, or the like, and it performs an image formation of an object image to the sensor device 210. Also, if necessary, it performs a focus adjustment, and the like.

The sensor device 210 was explained in FIG. 6 and the like, and performs an image processing of an object image. The image processing part 220 performs variety of image processing such as an image correction process based on a digital image data (image data) from the sensor device 210.

The processing part 230 controls entire electronic apparatus, and controls the respective blocks in the electronic apparatus. For example, the processing part 230 is realized as a CPU, or the like. The memory part 240 stores variety of information and for example, it functions as in a work area of the processing part 230 or the image processing part 220. The control part 250 is an interface for a user to control the electronic apparatus, and for example, it is realized by the variety of buttons, the GUI (Graphical User Interface) display, or the like. The display part 260 displays, e.g., an image acquired from the image sensor 210, the GUI display, or the like, and it is realized by the various types of displays such as a liquid crystal display, an organic EL display, or the like, or a projection type display device.

By the way, an infrared camera using FPA (Focal Plane Array: Focal plane array) or the electronic apparatus using an infrared camera can be applied in the present embodiment. Examples of electronic apparatuses in which an infrared camera is applied could include navigation apparatuses for forming images of objects in the dark, thermographic apparatuses for acquiring temperature distributions of an object, intrusion-detecting devices for detecting human intrusion, analytic apparatuses (measuring apparatuses) for analyzing (measuring) the physical information of an object, security apparatuses for detecting fire and heat generation, and FA (factory automation) apparatuses provided to factories and the like. If the navigation apparatus is applied to a vehicle-mounted apparatus, images of people and the like can be detected and displayed when the vehicle is traveling in the dark. If the apparatus is applied to a thermographic apparatus, the apparatus can be used for influenza quarantine and the like.

Figure 12:
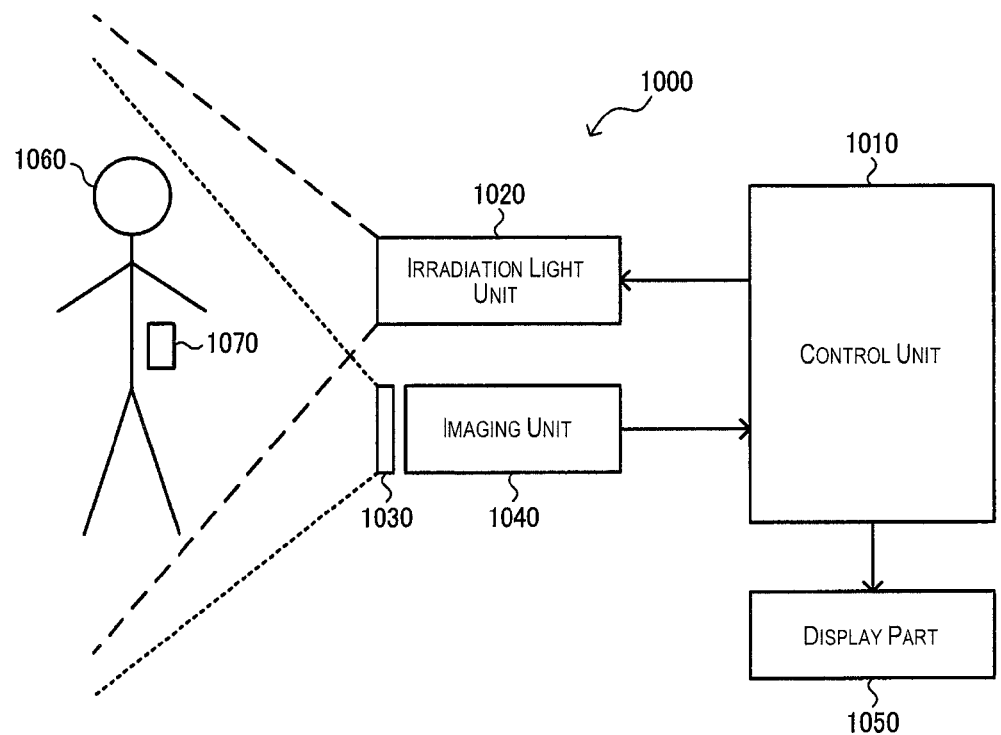
FIG. 12 shows a body temperature measuring device (electronic apparatus) that includes a terahertz camera.

As an example of the electronic apparatus that includes a pyroelectric type light detector or a pyroelectric type light detection device of the present embodiment, FIG. 12 shows an example that configures a specific material detection device 1000 combined with a terahertz light irradiation unit by using the sensor device as a terahertz light sensor device in which the absorption wavelength of the light absorption material of the pyroelectric type light detector in the above described sensor device 110 is in a terahertz area.

The specific material detection device 1000 is configured by a control unit 1010, a light irradiation unit 1020, an optical filter 1030, an imaging unit 1040 and a display part 1050. The imaging unit 1040 includes the sensor device in which the absorption wavelength of the light absorption material of the above described pyroelectric type light detector such as a lens that is not shown in the drawing is in the terahertz area.

The control unit 1010 includes a system controller to control the entire present device, and the system controller is included in the control unit to control the light source drive part and the image processing unit. The light irradiation unit 1020 includes a laser device and an optical system to irradiate the terahertz light (it indicates an electromagnetic wave that the wavelength is in a range of 100 μm to 1000 μm), and the terahertz light is irradiated to a human body as a detection object. By the way, the light irradiation unit 1020 can continues the light irradiation in the same manner as the light source 160 of FIG. 6A, but it is not necessary have to use the chopper 172 so that the laser oscillation itself can be turned on and off. The terahertz reflection light from the human body 1060 is received to the imaging unit 1040 through the optical filter 1030 that only gets through a spectroscopic spectrum of the specific material 1070 which is the detection object. A predetermined image process is processed to the image signal, which was generated in the imaging unit 1040, in the image processing unit of the control unit 1010, and the image signal is outputted to the display part 1050. By different strengths of the light-receiving signals, it can be judged whether or not the specific material 1070 is existed in clothing or the like of the human body 1060.

Figure 13:
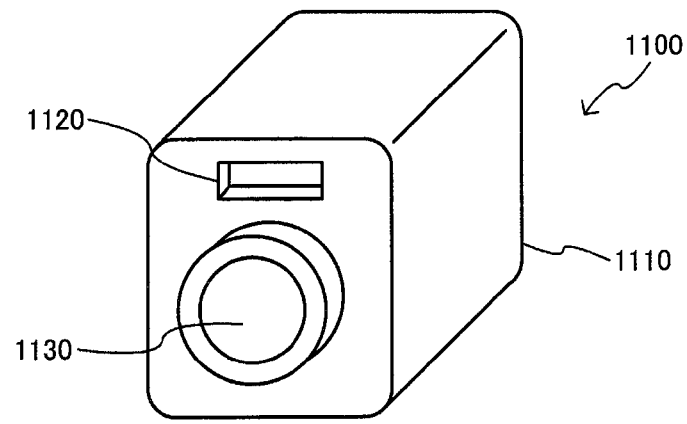
FIG. 13 is a perspective illustration of the terahertz camera.

FIG. 13 shows the terahertz camera 1100 that takes an image by receiving light that the frequency is terahertz. The terahertz camera 1100 includes a chassis 1110 having a slit 1120 and a lens 113.

Figure 14:
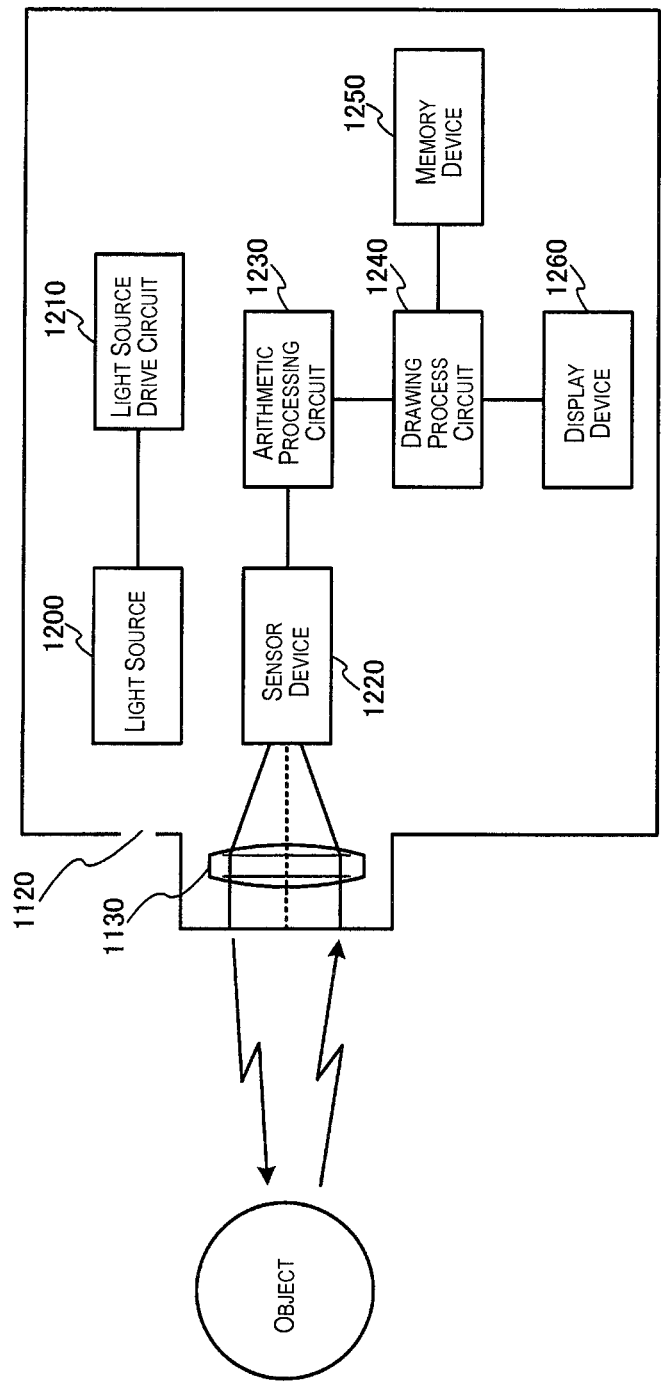
FIG. 14 is a block diagram of the terahertz camera.

As shown in FIG. 14, a terahertz light source 1200 and a light source drive circuit 1210 are provided in the chassis 1110, and the terahertz light is irradiated to an object through the slit 1120.

The reflection light from the object is concentrated in the lens 1130, and it is detected in the sensor device according to the above described embodiment. A digital signal from a sensor device 1220 is processed by an arithmetic processing in an arithmetic processing device 1230, it is processed by a drawing processing in a drawing process circuit 1240, it is stored in a memory device 1250, and it is displayed in a display device 1260 or else.

The usage of the terahertz camera can be varied, and other than the above described field, for example, in a field of a drug testing, a mixture of a polymorphism of a final drug at the time of the drug-manufacturing, a deviation of medicinal properties, and an existence or non-existence of cavities or foreign materials are detected. At the time of dosage, types or quantity of a medicine is checked or a foreign material is detected. At the time of dispensing of drugs, it is checked whether a type or a component of a drug that should be dispensed is correct. Other than that, when the terahertz camera is built-in various production lines, it is possible to check a total number of products.

The present embodiment was described in detail above, but the fact that many modifications are possible that do not substantially depart from the new matter and effects of the invention can be easily understood by a person of ordinary skill in the art. Such modified examples are therefore all included in the scope of the invention. For example, terms (VCC node, GND node, and the like) that are mentioned at least once together with different terms that are broader or identical in meaning (high-potential-side power node, low-potential-side power node) in the specification and drawings can be substituted with those different terms at any location in the specification and drawings. The configurations and operation of the detection circuit, the sensor device, and the electronic apparatus are also not limited to the descriptions of the present embodiment, and a variety of modifications are possible.

The entire disclosure of Japanese Patent Application No. 2012-095353, filed Apr. 19, 2012 is expressly incorporated reference herein.

What is claimed is:

1. A detection circuit comprising:
   a pyroelectric element;
   a source follower circuit that includes a transistor in which a detection signal is inputted to a gate from the pyroelectric element;
   a first switching element that interrupts an electric current that flows in the transistor; and
   a second switching element that interrupts a connection between the pyroelectric element and the gate of the transistor.

2. The detection circuit according to claim 1, wherein the second switching element interrupts the connection between the pyroelectric element and the gate of the transistor before the first switching element releases the interruption of the electric current that flows in the transistor.

3. The detection circuit according to claim 2, further comprising: a discharge switch that discharges an electric charge of a wire that connects between the second switching element and the gate of the transistor.

4. The detection circuit according claim 3, wherein a discharge performed by the discharge switch is end after the first switching element released the interruption of the electric current that flows in the transistor, and additionally, before the second switching element releases the interruption of the connection between the pyroelectric element and the gate of the transistor.

5. The detection circuit according to claim 4, wherein the discharge switch starts a discharge operation before the connection between the gate and the pyroelectric element is released by the second switching element.

6. The detection circuit according to claim 1, wherein the source follower circuit has a first P-type transistor provided between an output node of the detection circuit and a low electric potential power node so as to input a detection signal to a gate, and
   a second P-type transistor provided between a high electric potential power node and the output node so as to set a gate as a reference voltage.

7. The detection circuit according to claim 6, further comprising: a reference voltage generation circuit that supplies the reference voltage to the gate of the second P-type transistor;
   wherein the reference voltage generation circuit has a third P-type transistor and a fourth P-type transistor that are connected in series between the high electric potential power node and the low electric potential power node,
   a connection node between a source of the third P-type transistor in which the low electric potential power node is connected to a drain and a drain of the fourth P-type transistor in which the high electric potential power node is connected to a source is defined as an output node of the reference voltage generation circuit, the low electric power node is connected to a gate in the third P-type transistor, and the output node of the reference voltage generation circuit is connected to a gate in the fourth P-type transistor.

8. The detection circuit according to claim 7, wherein the first switching element is defined as a fifth P-type transistor that interrupts the electric current that flows in the first P-type transistor and the second P-type transistor, the reference voltage generation circuit has a sixth P-type transistor that interrupts the electric current that flows the third P-type transistor and the fourth P-type transistor, and a same signal is supplied to gates of the fifth P-type transistor and the sixth P-type transistor.

9. A sensor device comprising that the detection circuit according to claim 1.

10. A sensor device comprising:
a plurality of row lines;
a plurality of column lines;
a plurality of pixel circuits that are connected to each one of the plurality of row lines and the plurality of column lines;
wherein each of the plurality of pixel circuits includes a pyroelectric element,
a source follower circuit that includes a transistor in which a detection signal is inputted to a gate from the pyroelectric element, a first switching element that interrupts an electric current that flows to the transistor, a second switching element that interrupts between the pyroelectric element and the gate of the transistor before the first switching element interrupts the electric current that flows to the transistor, a pixel selection switch that supplies a signal based on a change of the electric charge of the pyroelectric element to one of the plurality of column lines in a period that one of the plurality of row lines is driven, and a discharge switch that discharges the electric current of a wire that connects between the second switching element and the gate of the transistor, wherein in the pixel circuits that connect to one of the driven row lines, the electric discharge performed by the discharge switch is end after the first switching element released the interruption of the electric current that flows to the transistor and additionally, before the second switching element releases the interruption of the connection between the pyroelectric element and the gate of the transistor.

11. The sensor device according to claim 10, wherein the first switching element is shared by the pixel circuits connected to one of the row lines.

12. An electric apparatus comprising the detection circuit according to claim 1.

13. An electric apparatus comprising the sensor device according to claim 9.

* * * * *